(12) United States Patent
Apthorp et al.

(10) Patent No.: US 9,002,882 B2
(45) Date of Patent: Apr. 7, 2015

(54) DISTRIBUTED ARCHITECTURE FOR PAPERWORK IMAGING

(75) Inventors: Adrian Paul Apthorp, Lingfield Surrey (GB); David Jenkinson, Prague (CZ); Charlie Dobbie, Bonn (DE); Ian Sykes, Plantation, FL (US); Dave Kelly, Singapore (SG)

(73) Assignee: Deutsche Post AG, Bonn (DE)

( * ) Notice: Subject to any disclaimer, the term of this patent is extended or adjusted under 35 U.S.C. 154(b) by 129 days.

(21) Appl. No.: 13/578,006

(22) PCT Filed: Feb. 7, 2011

(86) PCT No.: PCT/EP2011/051711
§ 371 (c)(1),
(2), (4) Date: Aug. 9, 2012

(87) PCT Pub. No.: WO2011/098415
PCT Pub. Date: Aug. 18, 2011

(65) Prior Publication Data
US 2012/0310979 A1 Dec. 6, 2012

(30) Foreign Application Priority Data

Feb. 10, 2010 (EP) .................................... 10153126

(51) Int. Cl.
*G06F 17/30* (2006.01)

(52) U.S. Cl.
CPC .............................. *G06F 17/30011* (2013.01)

(58) Field of Classification Search
CPC ..................... G06F 17/30174; G06F 17/30094
USPC .................................................. 707/770, 825
See application file for complete search history.

(56) References Cited

U.S. PATENT DOCUMENTS

| 5,361,393 | A | * | 11/1994 | Rossillo | 713/1 |
| 6,253,198 | B1 | | 6/2001 | Perkins | |
| 6,424,966 | B1 | * | 7/2002 | Meyerzon et al. | 707/610 |
| 7,599,942 | B1 | * | 10/2009 | Mohamad | 1/1 |
| 7,765,549 | B1 | * | 7/2010 | Lauer | 718/101 |
| 8,024,733 | B2 | * | 9/2011 | Hambrick et al. | 718/101 |
| 8,615,485 | B2 | * | 12/2013 | Yonatan et al. | 707/610 |
| 8,832,025 | B2 | * | 9/2014 | Arai et al. | 707/634 |
| 2008/0147631 | A1 | * | 6/2008 | Leffingwell et al. | 707/5 |
| 2009/0006920 | A1 | * | 1/2009 | Munson et al. | 714/748 |
| 2010/0161655 | A1 | * | 6/2010 | Gil et al. | 707/769 |
| 2011/0055834 | A1 | * | 3/2011 | Meda et al. | 718/101 |

FOREIGN PATENT DOCUMENTS

WO    WO03060774 A1    7/2003

OTHER PUBLICATIONS

International Search Report for PCT/EP2011/051711, filed Feb. 7, 2011, dated 29 Jun. 22, 2011, 8 pp.

* cited by examiner

*Primary Examiner* — Noosha Arjomandi
(74) *Attorney, Agent, or Firm* — International IP Law Group, PLLC

(57) ABSTRACT

The present invention provides a method and system for storage of data files, comprising notifying at least one local reference storage about storing and/or deleting a data file on a central data repository, depositing a reference element on the at least one local reference storage after notifying, requesting a deposited reference element from the local reference storage for demanding a data file contained in the central data repository, retrieving the demanded data file on submitting the reference element to the central data repository.

10 Claims, 1 Drawing Sheet

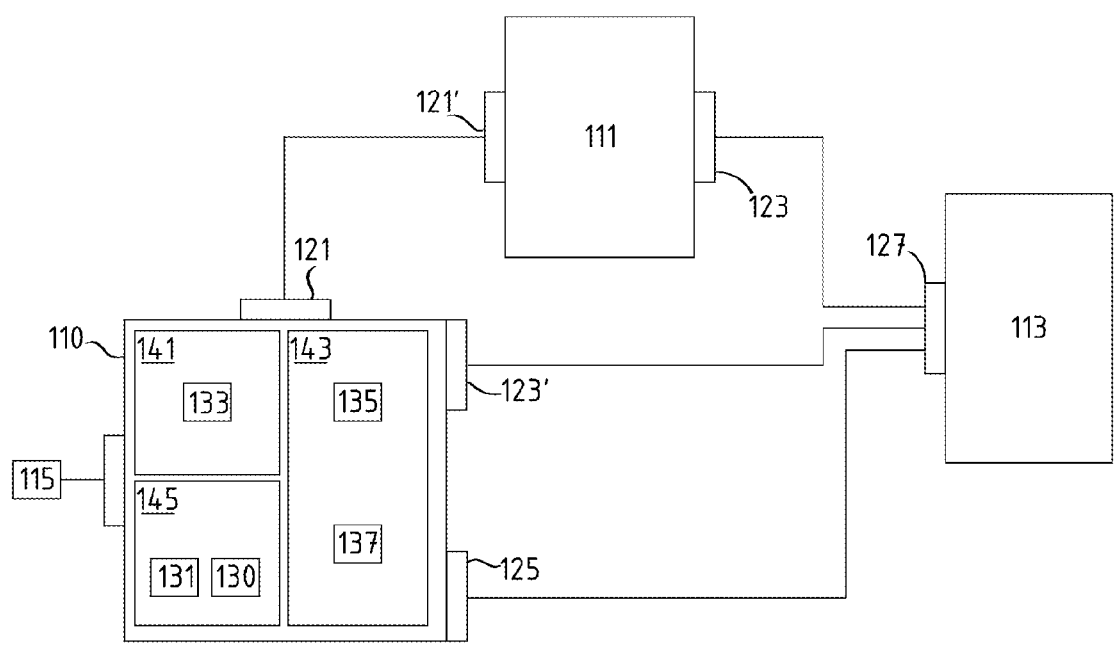

DISTRIBUTED ARCHITECTURE FOR PAPERWORK IMAGING

CROSS-REFERENCE TO RELATED APPLICATIONS

Pursuant to 35 U.S.C. §371, this application is the United States National Stage Application of International Patent Application No. PCT/EP2011/051711, filed on Feb. 7, 2011, the contents of which are incorporated by reference as if set forth in their entirety herein, which claims priority to German (DE) Patent Application No. 10153126.7, filed Feb. 10, 2010, the contents of which are incorporated by reference as if set forth in their entirety herein.

BACKGROUND

Courier services are specialised in delivering mail pieces of high priority, high value or high sensitivity in express good mailing. Computer systems serving courier services for executing and organising logistic processes and further for the exchange of data with major customers are known.

Generally for international shipment of cargo paperwork concerning the content and customs declaration of mail pieces in form of waybills or shipping lists are mandatory. Additional services e.g. registered letters, additional papers or information in form of large data files are necessary. In some cases processing of shipment documents before the actual arrival of the cargo, e.g. for the reason of custom declaration paperwork, is advantageous.

Traditionally, waybill documents will be affixed to cargo units. Through an electronic submission of shipping documents by the delivery of cargo pieces can, however, may be significantly simplified.

For this reason it is desirable to provide an electronic processing of arbitrary cargo documents. Often, cargo documents are provided as scanned images of hand-written paper documents. Such a scanned document has a large amount of data. Accordingly, it is necessary to take steps to transfer such data to the place of delivery in a dependable and effective way. Due to different available data transmission capacity to the actual location of delivery, a solution must be found to allow an access to image documents with large amount of data in an easy and reliable way, independent of the place of service and independent of locally available data transmission capacity.

The subject innovation relates to distributed computer systems and computer architecture for storing and referencing of large data files.

It is the object of the subject innovation to provide a flexible and time efficient method to pre-deliver shipment documents for custom declaration, pickup and/or delivery of physical objects.

According to the subject innovation, this object is achieved by a method according to claim 1 and a system according to claim 7.

The subject innovation proposes a method for storage of data files on a central file storage, comprising:
- notifying at least one local reference storage about storing and/or deleting a data file on a central data repository;
- depositing a reference element on the at least one local reference storage after notifying;
- requesting a deposited reference element from the local reference storage for demanding a data file contained in the central data repository;
- retrieving the demanded data file on submitting the reference element to the central data repository.

Further the subject innovation proposes a system for storage of large data sets with at least one local reference storage and a central data repository, providing communication interfaces, comprising:
- a notification interface for notifying the at least one local reference storage about storing and/or deleting of data files on the central data storage;
- a location interface to locate a requested data file of the central data storage by a reference element in the local reference storage;
- a retrieval interface to retrieve the data file in the central data storage on submitting the reference element to the central data repository.

The subject innovation deals with a system for providing easy and effective access with a small handheld terminal with limited storage capacity or a terminal connected via an internet link with limited traffic capacities to large data files e.g. scanned images of freight documents stored on a remote central server.

The main benefit of the proposed architecture is that it allows a single consistent approach to be taken to providing image access across a computer network. This in turn has the potential for a number of common components to be developed only once for the network.

Additionally, the architecture of the subject innovation provides better support for the customer service requirement for accessing images. The original architecture required the customer service agent to go through a number of additional steps in order to actually locate the images that they were interested in. With the architecture proposed in the subject innovation an integrated user interface is being developed that allows a customer service agent to query shipment status and also be presented with the availability of images of waybills or customs declaration documents for that shipment on a local storage and then directly retrieve the chosen image for the central storage server.

As the architecture has local image reference handling component the load associated with retrieving images is distributed across the network. As large data files are "pulled" rather than "pushed" large data traffic on the computer network is minimized.

In an embodiment the subject innovation provides that the reference data is being deposited on a plurality of local reference storages. Information about the index references will be distributed across multiple local references within the network. Thus, transfer times within the network are minimized and so data traffic is not subject to interference or disruption. The data advantageously can be placed on the local references in a preferred order. For example, frequent local references can be stored on a memory with fast availability and low average access time.

The subject innovation also provides a method, wherein a request for a data file can be routed to one selected reference storage under a choice of several local reference storages. In the context of load balancing within a network requests to local references can be conducted such that the network is uniformly and optimally loaded.

The subject innovation also provides a method, wherein the interface receives a data file to locate request information and outputs a reference element in the form of a uniform resource locator and/or a uniform resource number. Referencing to access the image files will be made in a manner that uses consistent references such as Uniform Resource Locators. Moreover, it is possible that these reference numbers are available to access other image transmission technologies such as fax or the like.

The subject innovation also provides a method, wherein the large data file and the data file reference may administrated by a store logic unit. The store logic unit provides a load balanced utilization of the disk media and at the same time provides a reliable assignment of the data to references and indexes.

The subject innovation also provides a method, wherein the location and/or retrieve of data is being conducted by an access server providing a query and/or retrieve logic.

An access server and logic ensures that the service requested by e.g. the references, the requested image files are in a format adapted to the client.

The aforementioned and other aspects of the subject innovation will also be apparent from and elucidated with reference to the embodiments of the subject innovation described herein after making reference to the drawings.

BRIEF DESCRIPTION OF THE DRAWINGS

FIG. 1 is a schematic view of computer architecture in accordance with the subject innovation.

DETAILED DESCRIPTION OF SPECIFIC EMBODIMENTS

FIG. 1 is a schematic view of computer architecture in accordance with the subject innovation. FIG. 1 represents the basic structure of computer architecture. The architecture consists of a number of components 110, 111, 113, in which some are centrally provided, such as, the server 110. Others are distributed across the network, for example, the local reference 111 and the client 113. Different parts of the computer architecture interfaces are connected.

The server consists of a data store 145, an index memory 141 and an access server 143. Captured large information is received and stored by the image server. The store logic 131 transfers the image data file to the image data base and the index of the storage on the image data base to the index data base 133. The index database 133 triggers a notification and forwards the index information to the local reference 111 locally or globally. In one embodiment, the notification information may be sent to a shipment destination's import processing location 111, which provides an index store.

The store logic 131 manages the access to a first or image database 130 for stored image information, which contains images of scanned documents, like waybills, custom declarations etc. The storage logic 131 is applied for the storage and retrieval of information. In one embodiment of the subject innovation, the image servers 110 are implemented within a country or for a group of countries, and at transit facilities.

The large information server 110 provides three main components: The image store part 145 of the server provides the image database 130 and the store logic 131. Within the image database server 130, large image data files are managed in an image database store 130. An image database store 130 may be embodied as a simple database with a low retention period or as a large memory archival system with full hierarchical large memory storage and management capabilities.

The index store 141 of the server provides support for the management of local references 111 of image data files. The image database server 110 is providing an index store 133 that maintains a copy of the searchable attributes of the image database 130 data files to the notification interface 121.

The access server 143 provides an interface between the image requestor and the image store and may be co-located with the image store. In addition, the server has three interfaces: a localization interface, a query interface and a notification interface.

In order to provide an interface for retrieving large images via either a browser or a business application, the HTTP protocol may be selected.

The architecture consists of a number of components distributed across the network, like the local references 111, the user clients 113, and others centrally provided, like the server 110. The components are connected with each other or with interfaces. Each interface 121,121', 123, 123', 125, 127 is connected to components of the network, wherein each interface has a specific task for providing their unified large architecture.

The information server 110 is provided with an information capture application 115, providing, e.g., large images of clearance paperwork or other cargo related documents. The information is captured and passed to a store logic 131 and capture information data. The store logic analyzes the incoming information and provides data to a large database, which provides storage for large data and the references of the large data stored on the large database, to an index database. The capturing of images or data my also be provided by a handheld 113 with a scanner, a touch screen or the like device for data capturing. For example, the signature of a customer may be captured in the mail delivery process.

Further, the stored logic provides information for notification interfaces, providing information for specific components outside the origin domain of the central server.

The index databases are connected to an index query logic 135 on the access server 143. Further, the image database 130 is connected to an image retrieve logic 137 on the access server 143.

The image data administration architecture identifies at least the following interfaces:

Notification interface 121, 121'
Retrieve interface 125
Locate interface 123, 123'

These interfaces are for documents indexed by an internal registration numbers system, or by any other computer-based registration system. However, the same architecture may be used for indexing and retrieving documents with a different key.

The architecture also includes the interfaces for querying shipment clearance information to support the requirements for Clearance Paperwork Imaging.

Notification to Image Reference Data

The Notification interface 121, 121' is an event based interface that sends a notification to interested parties of the availability of an image and provides a reference for locating the stored image database 130. Interested parties include the location performing import processing of a shipment and the local reference 111. Notifications also may be sent for shipment document and delivery sheet images.

The reference may be implemented by a URL, by a URN (Uniform Resource Name) or any other linking and reference system. Any other known suitable system may be used as well.

The notification interface may be implemented with a message referred to as the large data reference message. The large data reference message may be routed via a proprietary computer message-based infrastructure, either using a Common Messaging Platform or Communications Infrastructure.

Retrieve Image Data

The Retrieve Image interface allows a user to request an image by passing the image's "reference" to the image server. In response to the request for an image, the server either returns the image or an error message. In one embodiment, the large data may be returned, e.g., as an image in TIFF format. Further, the interface may be implemented using HTTP.

A standard TCP/IP port number, e.g. port 29001, has been identified for image retrieval. This enables image traffic on proprietary networks to be managed. Further, it is thus possible to obtain images of alternative routes such as, a fax or the like. Such a procedure is advantageous in areas of the world where an Internet connection is available, but a telephone is not.

Locate Image Data

The Locate Image interface allows a user to search for an image based on some attributes associated with it. In the case of shipment documents, the searchable attributes are attributes of a shipment. In the case of delivery sheets, the searchable attributes relate to the delivery route. In one embodiment, the interface may be implemented using HTTP.

The Local reference 111 supports the client locating a paperwork image associated with a shipment, as well as providing a central lookup for image reference information for clearance processing. This index store may also hold notifications of delivery sheet images or waybill images. Also, images for executing the delivery may be stored, like maps or data for identification, like biometrical data or the like, may be stored and delivered to the client device on request. To retrieve waybill sheet images in this way depends upon establishing the relationship between a delivery checkpoint and delivery sheet image notification based on courier route information.

The client 113 may be a device that is used to deliver mail pieces, such as a laptop, a computer or a handheld device. The device provides conventional methods and devices to send and receive data. For example, typically, the device provides a proxy or a cache, and also provides operating software that is typically embodied with a browser and a TIFF viewer. The client has an interface 127 for sending and receiving data to peripheral computers.

The retrieval of images for direct, on-screen viewing by customer service agents may be performed with a client or client device 113. The retrieval of images for direct, on-screen viewing by import processing staff and ad-hoc users is by a standard web browser, with either a TIFF plug-in or an external TIFF viewer configured as a helper application. An external TIFF viewer is widely available in current operating systems.

A proxy image server may be provided within the client 113 for caching of image reference information and of retrieved images. Image reference information is pro-actively cached by the distribution of the image reference message to the proxy image servers that support clearance processing. As a proxy, this component provides the same interfaces as the services it is acting as a proxy for: Locate Image and Retrieve Image.

This component supports the identification of shipments for which clearance processing is performed, and in particular, for which the supporting paperwork images are used.

For each image stored on the server 110, the store logic 131 generates an index reference. The references are stored in the index database 133. The index database 133 sends a message to the notification interface 121 and to the index query logic 135, respectively. The notification interface 121 passes the index references notice to the corresponding interface 121' for storing the data to a local reference 111.

Hence, in the case a client 113 requires an image of a freight's waybill, the client 113 addressed a request over the interfaces 127 and the locate interface 123 to the local reference 111. The local reference 111 passes the requested reference information on the locate interface 123. The locate interface 123 passes this information back as a data link to the client 113. The client 113 is setting up an inquiry with the corresponding data link to the retrieval interface 125 of access server 143. The data retrieve logic 137 processes the data link and requests the requested image data from the image data storage 130 to the access server 143 and passes the image e.g. in a TIFF Format via the retrieve interface 125 to the client 113.

What is claimed is:

1. A method for providing image access across a computer network comprising a local reference storage, a client and a central data storage for storage of data files comprising a store logic unit, an image data base and an index data base, comprising:
   administrating the data files and a reference element by store logic units by transferring the data files to the image data base and an index of a storage on the image data base to the index data base providing a reliable assignment of the data files to references and indexes, wherein the index data base maintains copies of searchable attributes of the data files for providing to notification interfaces connecting a plurality of local reference storages to an image database server;
   notifying the plurality of local reference storages about storing and/or deleting one of the data files on the central data storage triggered by the index database of the central data storage via the notification interfaces;
   depositing the reference element on the plurality of local reference storages after notifying by the central data storage;
   locating a requested data file of the data files of the central storage by the reference element in the local reference storage over a location interface of the local reference storage by the client;
   requesting the deposited reference element from the local reference storage by the client for demanding one of the data files contained in the central data storage;
   passing the requested deposited reference element back to the client by a local interface of the local reference storage; and
   retrieving the demanded data file on submitting the reference element to the central data storage via a retrieving interface of the central data storage, where requested image data is passed from the image data base via a retrieval interface to the client.

2. The method of claim 1, wherein a request for the demanded data file can be routed to one pre-determined local reference storage of the plurality of local reference storages.

3. The method of claim 1, wherein an interface receives a request to locate the demanded data file and outputs the reference element as a uniform resource number.

4. The method of claim 1, wherein the location and/or retrieval of the demanded data file is performed by an access server providing a query and/or retrieval logic.

5. A system comprising a computer network providing image access across the computer network, the computer network comprising:
   a central server providing a central data storage storing large data files comprising a store logic unit, an image data base, and an index memory comprising an index database, the store logic unit to administrate the large data files and a reference element transferring the large data files to the image data base and an index of a storage on the image data base to the index data base a reliable assignment of the large data files to references and indexes;

at least one local reference storage distributed across the computer network, the local reference storage comprising a memory; and a client device connected with each other via communication interfaces comprising:

a notification interface configured to notify the at least one local reference storage about storing and/or deleting one of the data files located on the central data storage triggered by the index database wherein the notification interface is an event based interface between the server and the local reference of interested parties, and wherein the index database maintains copies of searchable attributes of the data files for providing to the notification interface;

a location interface of the local reference storage configured to locate a requested data file of the large data files of the central data storage by the reference element in the local reference storage and to pass the requested reference element back to the client device by the local interface of the local reference storage to locate the requested data file of the large data files of the central data storage; and a retrieval interface configured to retrieve the requested data file from the central data storage upon submitting the reference element to the central data storage and to pass the requested image data from the data base via the retrieve interface to the client device.

6. The system of claim 5, wherein each reference data storage provides stored reference data of the central data storage.

7. The system of claim 5, wherein a request for the requested data file can be routed to one selected reference storage of a plurality of local reference storages.

8. The system of claim 5, wherein the location interface receives a data file to locate request information and outputs a reference element as a uniform resource locator.

9. The system of claim 5, wherein the location and/or retrieval of data is performed by an access server providing a query and/or retrieval logic.

10. System according to claim 5, further comprising an access server providing an interface to a requestor, wherein the index data base is connected to an index query logic on an access server and the data base is connected to an data retrieve logic on the access server, where the data retrieve logic requests the requested data file from the data base.

* * * * *